United States Patent [19]

Huber et al.

[11] Patent Number: 4,542,925
[45] Date of Patent: Sep. 24, 1985

[54] BUMPER FOR AN AUTOMOTIVE VEHICLE

[75] Inventors: Guntram Huber, Aidlingen; Wolfgang Fischer, Leinfelden; Wolfgang Klie, Korntal, all of Fed. Rep. of Germany

[73] Assignee: Daimler-Benz Aktiengesellschaft, Stuttgart, Fed. Rep. of Germany

[21] Appl. No.: 526,772

[22] Filed: Aug. 26, 1983

[30] Foreign Application Priority Data

Sep. 4, 1982 [DE] Fed. Rep. of Germany ....... 3232940

[51] Int. Cl.$^4$ .............................................. B60R 19/08
[52] U.S. Cl. .................................... 293/120; 293/135; 293/109
[58] Field of Search ................ 293/102, 107, 120–122, 293/132, 135–136, 139, 149, 153–155, 109, 126, 137

[56] References Cited

U.S. PATENT DOCUMENTS

| 955,624 | 4/1910 | Welton | 293/122 |
| 1,665,320 | 4/1928 | Nutt | 293/155 |
| 1,666,754 | 4/1928 | Rahe | 293/135 |
| 2,029,824 | 2/1936 | La Pointe | 293/135 X |
| 3,836,188 | 9/1974 | Klees | 293/120 |
| 3,900,222 | 8/1975 | Muller | 293/122 X |
| 4,072,334 | 2/1978 | Seegmiller et al. | 293/122 X |
| 4,221,413 | 9/1980 | Bonnetain | 293/122 |
| 4,264,094 | 4/1981 | White et al. | 293/135 |

FOREIGN PATENT DOCUMENTS

| 2361213 | 6/1975 | Fed. Rep. of Germany | 293/154 |
| 2418459 | 10/1975 | Fed. Rep. of Germany | 293/135 |
| 2919046 | 11/1980 | Fed. Rep. of Germany | 293/120 |

Primary Examiner—Robert B. Reeves
Assistant Examiner—Russell D. Stormer
Attorney, Agent, or Firm—Barnes & Thornburg

[57] ABSTRACT

A bumper arrangement for an automotive vehicle is disclosed which includes a bending-resistant bumper support resting on parts affixed to the vehicle, an undulating leaf spring extending over the length of the bumper arranged in front of this bumper support, and a cover which can be locked to the bumper support and which serves to hide the leaf spring from view. The leaf spring is fashioned integrally with the bumper support, and is preferably made of a reinforced synthetic resin. The wavy windings of the leaf spring are aligned in the support zone extending transversely with respect to the automotive vehicle, in the longitudinal vehicle direction, and, in the laterally wrapped-around end zones of the support, approximately in the transverse vehicle direction. Energy absorbing elements and impact buffers are interposed between the undulations of the leaf spring and between the bearing support and the adjacent section of the leaf spring.

22 Claims, 3 Drawing Figures

BUMPER FOR AN AUTOMOTIVE VEHICLE

BACKGROUND AND SUMMARY OF THE INVENTION

The invention relates to a bumper for an automotive vehicle, including a bending-resistant support resting on parts affixed to the vehicle, an undulating leaf spring extending over the length of the bumper arranged in front of this support, and a cover which locks onto the support for covering the leaf spring from view.

Such a bumper is known from DOS [German Unexamined Laid-Open Application] No. 2,418,459 wherein the spring, capable of energy absorption, consists of a metallic material and is introduced as a separate component into a cavity between a support and a cover. The undulations of the leaf spring are supported, in their turning zones, alternatingly against the support and the cover, so that no supporting is effected between two turning zones. For this reason, with a spotwise contact of the cover outside of the supporting zones, there is the danger of a local overextension of the cover so that the latter must be replaced even in case of a relatively harmless collision.

It is an object of the invention to ensure, while reducing the number of individual parts and the assembly expenses, that spotwise effects of an impact do not lead to permanent deformation effects on the cover.

For this reason, a bumper is proposed of the type discussed hereinabove wherein, according to this invention, the leaf spring is joined integrally with the support, which latter consists preferably of a reinforced synthetic resin, and wherein the undulating windings of the leaf spring are aligned, in the zone of the support extending at right angles to the vehicle, in the longitudinal vehicle direction and, in laterally wrapped-around end zones of the support, approximately in the transverse vehicle direction.

In one embodiment of the invention, the support includes at least two sections extending over the length of the bumper, these sections being connected to each other by mounting elements arranged along the route of the superimposed windings. In case of stress, a relative movement takes place between the superimposed windings, with energy absorption.

To further increase energy absorption, it is proposed to provide that the windings, in their open region in opposition to the respectively associated turning zone thereof, are supported by way of energy-absorbing elements against each other and/or against the support.

In especially preferred embodiments of the invention, the energy-absorbing elements consists of a foam material.

Overstressing of the leaf spring can be avoided by providing, instead of or additionally to the energy-absorbing elements, impact buffers limiting the inward stroke movements of the windings, according to certain preferred embodiments. These impact buffers are considered in cases where the amount of blockage occurring upon exhaustion of the energy-absorbing power of the energy-absorbing elements is too small.

According to certain preferred embodiments, at least one turning zone of the windings can be provided with cutouts in order to adapt the spring characteristic.

An elasticity modulus adapted to requirements can be advantageously attained, according to preferred embodiments, by providing that the reinforcements in the support consist of fibers oriented primarily—in adaptation to the profile configuration of the support—in the direction of a vertical vehicle axis and of a longitudinal vehicle axis, and by providing that also the leaf spring is reinforced by fibers oriented predominantly in the transverse direction of the vehicle.

Finally, it is also contemplated to adapt the wall thickness and/or the fiber density of the support to the loads which may be encountered.

Further objects, features, and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
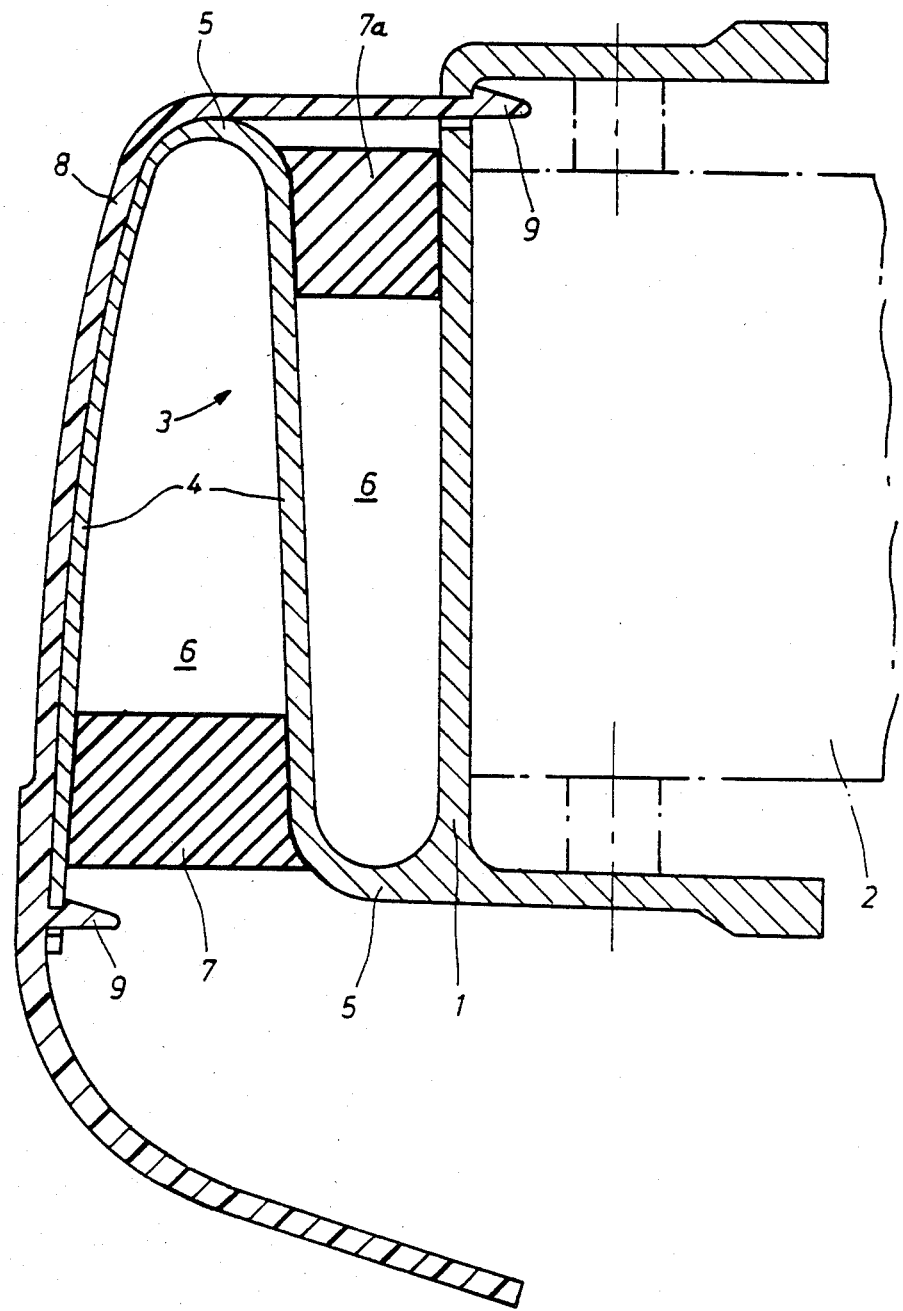
FIG. 1 is a sectional schematic view which shows a bumper constructed according to a first preferred embodiment of the invention, with a one-piece support and a single-layer leaf spring.

According to FIG. 1, an approximately U-shaped support 1, consisting of a synthetic resin, rests on a part 2 affixed to the vehicle and cursorily illustrated. A wavy leaf spring 3 is joined integrally to the support 1 and extends over the length of the bumper. In case of bumper end zones which are wrapped around laterally, the leaf spring 3 extends up to the end of the bumper. The leaf spring 3 consists of two windings 4 aligned in the zone of the support 1 extending at right angles to the automotive vehicle, in the longitudinal vehicle direction—as illustrated. If the support 1, in a manner not shown, comprises laterally wrapped-around end zones equipped with a leaf spring, then the windings at that location are oriented approximately in the transverse vehicle direction.

Open zones 6 are located in opposition to the turning zones 5 of the windings 4, these open zones accommodating energy-absorbing elements 7, 7a made of a foam material, so that the windings 4 are supported against each other by elements 7 and, on the support side, on the support 1 proper by elements 7a. A cover 8 of a viscoelastic material, terminating toward the bottom as an apron, is fixedly attached by clips 9 to the support 1 and to the foremost winding 4 so that at least the leaf spring 3 is hidden from view from the front and from the top.

Figure 2:
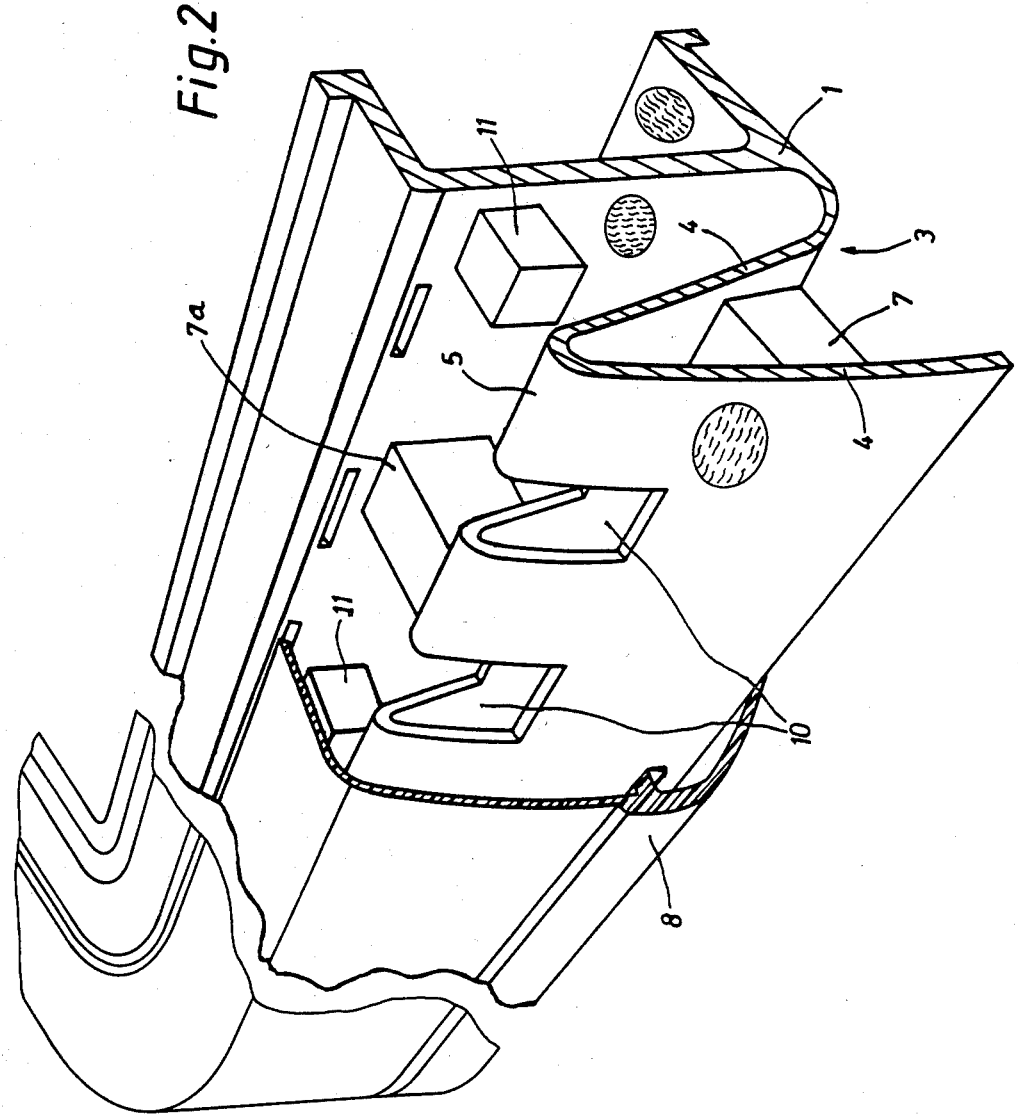
FIG. 2 is a perspective, oblique partial schematic sectional view of the embodiment of FIG. 1 with the cover being partially omitted.

As can be seen from FIG. 2, cutouts 10 are provided in the upper turning zone 5, serving for adaptation of the spring characteristic. Furthermore, the energy-absorbing elements 7, 7a are not fashioned as a continuous cord but rather as individual pads, and impact buffers 11 are arranged—projecting away from the support 1—between the individual energy-absorbing elements 7a and limit the inward deflection movement of the winding 4 in proximity to the support. In a manner not shown, it is also contemplated to provide impact buffers 11 between the windings 4 so that the winding 4 close to the impact is likewise prevented from an excessive inward deflection movement, in certain preferred embodiments.

Figure 3:
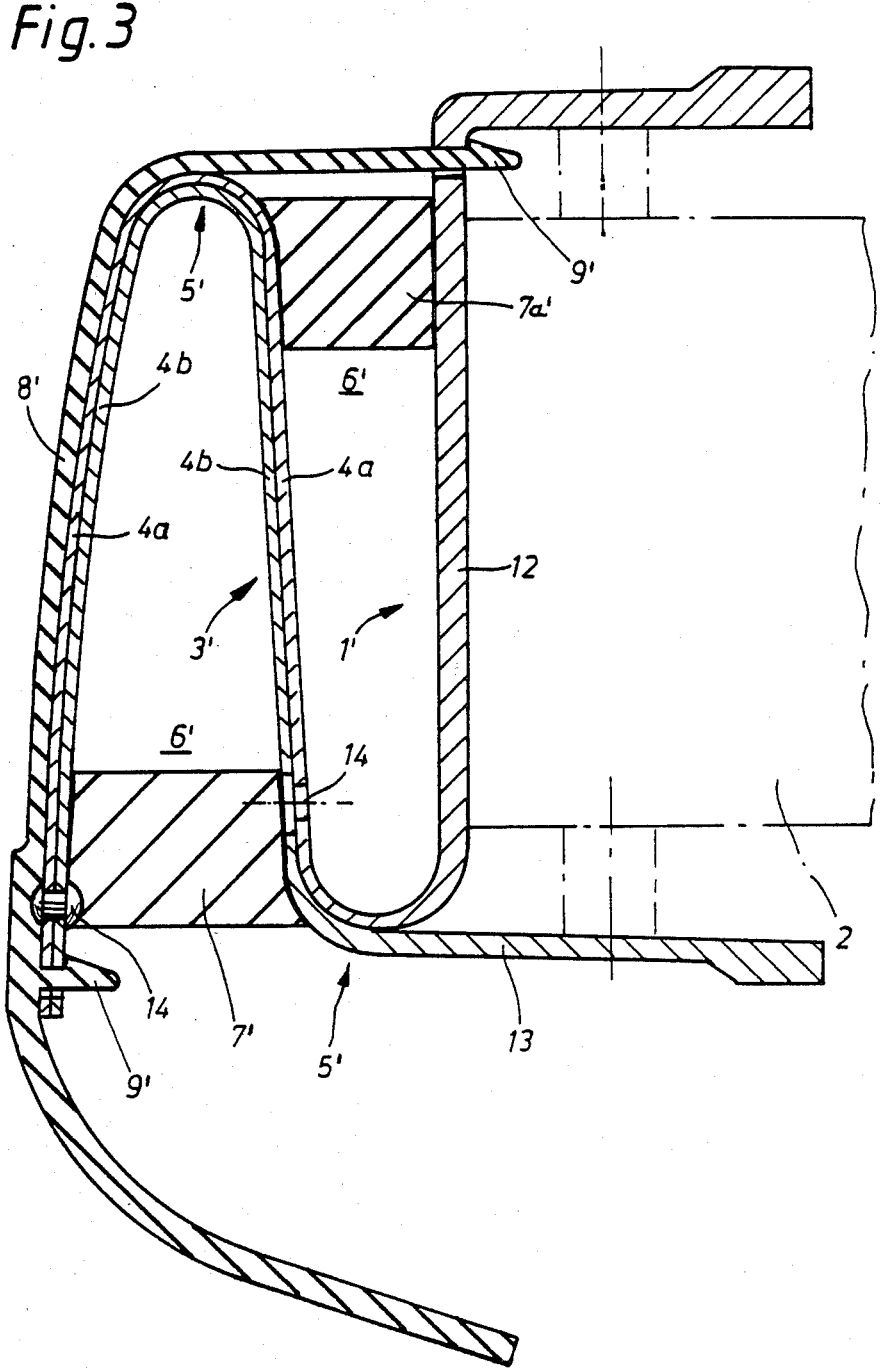
FIG. 3 is a view similar to FIG. 1 which shows a bumper constructed according to a second preferred embodiment of the invention, with a bipartite support and a layered leaf spring.

The embodiment of FIG. 3 is extensively identical to that of FIGS. 1 and 2, so that identical primed reference numerals are utilized for like components. The support 1' is composed of an upper, angular section 12 and a lower, flat section 13, the section 12 passing over into windings 4a and the section 13 into windings 4b, which are superimposed and joined by mounting elements 14 with each other in such a way that, in case of inward deflection movements, additional energy absorption is performed by the friction occurring between the windings 4a and 4b.

As illustrated in the circular, enlarged views of FIG. 2, the support 1' as well as the leaf spring 3' are reinforced by fibers which can consist, for example, of glass or carbon. In this arrangement, a noticeable increase in strength is attained if, in the vertically running web zone of the support 1', the fibers are aligned in the direction of a vertical vehicle axis and the fibers are aligned, in the legs of the support extending approximately horizontally, in the direction of a longitudinal vehicle axis. In the leaf spring 3', a fiber orientation occurs in the transverse direction of the vehicle. These statements relate to a bumper design which is not wrapped around the sides. However, if the bumper has end zones of such a type, then the orientation of the fibers will be retained with respect to the above-described tendency—only the direction based on the vehicle changes accordingly.

While we have shown and described several embodiments in accordance with the present invention, it is understood that the same is not limited thereto but is susceptible to numerous changes and modifications as would be known to those skilled in the art of the present disclosure and we therefore do not wish to be limited to the details shown and described therein but intend to cover all such changes and modifications as are encompassed by the scope of the appended claims.

What is claimed is:

1. A bumper arrangement for an automotive vehicle comprising:
   a bending-resistant bumper support and means for fixedly attaching the support to a vehicle; and
   an undulating leaf spring extending over the length of the bumper support at an outwardly facing side of the support and a cover for hiding the leaf spring from view;
   wherein the leaf spring is integrally formed with the bumper support and is formed of synthetic resin, and wherein the wavy form of the leaf spring extends perpendicular to the longitudinal direction of the bumper support with the tangential planes of the apical regions of the undulating leaf spring extending horizontally.

2. Bumper arrangement according to claim 1, wherein the cover is snapfittingly locked to the bumper support.

3. Bumper arrangement according to claim 1, wherein said bumper support has lateral end zones bent away approximately in the vehicle longitudinal direction.

4. Bumper arrangement according to claim 1, wherein windings of the undulating leaf spring are supported by way of energy-absorbing elements against each other in the open zone lying in opposition to the respective apical region between the windings.

5. Bumper arrangement according to claim 4, wherein the energy-absorbing elements consist of a foam material.

6. Bumper arrangement according to claim 4, wherein at least one aptical region of the undulating leaf spring is provided with cutouts for adjusting spring characteristics intermediate the energy-aborbing elements.

7. Bumper arrangement according to claim 4, further comprising inpact buffers in the open zones between the windings of the undulating leaf spring and, respectively, between the winding closest to the bumper support and the bumper support, said impact windings.

8. Bumper arrangement according to claim 7, wherein at least one apical region of the undulating leaf spring is provided with cutouts for adjusting spring characteristics intermediate the energy-absorbing elements.

9. Bumper arrangement according to claim 4, wherein the bumper support has reinforcing fibers aligned primarily in the direction of a vertical vehicle axis and of a longitudinal vehicle axis; and wherein also the leaf spring is reinforced by fibers oriented primarily in the transverse vehicle direction.

10. Bumper arrangement according to claim 1, further comprising impact buffers in the open zones between the windings of the undulating leaf spring and, respectively, between the winding closest to the bumper support and the bumper support, said impact buffers limiting the inward deflection movements of the windings.

11. Bumper arrangement according to claim 1, wherein the bumper support has reinforcing fibers aligned primarily in the direction of a vertical vehicle axis and of a longitudinal vehicle axis; and wherein also the leaf spring is reinforced by fibers oriented primarily in the transverse vehicle direction.

12. Bumper arrangement according to claim 11, wherein the wall thickness and/or the fiber density of the bumper support is adapted to the load conditions encountered.

13. Bumper arrangement according to claim 1, wherein winding of the undulating leaf spring are supported by way of energy-absorbing elements against the bumper support in the open zone lying in opposition to the respective apical region between the winding closest to the bumper support and the bumper support.

14. Bumper arrangement according to claim 13, wherein the energy-absorbing elements consist of a foam material.

15. Bumper arrangement according to claim 13, further comprising impact buffers in the open zones between the winding of the undulating leaf spring and, respectively, between the winding closest to the bumper support and the bumper support, said impact buffers limiting the inward deflection movements of the winding.

16. Bumper arrangement according to claim 13, wherein at least one apical region of the undulating leaf spring is provided with cutouts for adjusting spring characteristics intermediate the energy-absorbing elements.

17. Bumper arrangement according to claim 13, wherein the bumper support has reinforcing fibers aligned primarily in the direction of a vertical vehicle axis and of a longitudinal vehicle axis; and wherein also the leaf spring is reinforced by fibers oriented primarily in the transverse vehicle direction.

18. A bumper arrangement for an automotive vehicle comprising:
- a bending-resistant bumper support and means for fixedly attaching the support to a vehicle; and
- an undualting leaf spring extending over the length of the bumper support at an outwardly facing side of the support and a cover for hiding the leaf spring from view;
- wherein the leaf spring is connected integrally to the bumper support and is formed of synthetic resin, and wherein the wavy form of the leaf spring extends perpendicular to the longitudinal direction of the bumper support with the tangential planes of the apical regions of the undulating leaf spring extending horizontally; and
- wherein the bumper support consists of two bumper support sections respectively extending over the entire length of the bumper; wherein the leaf spring has two layers, one layer being integrally joined to one bumper support section, and the other layer being integrally joined to the other bumper support section; and wherein the two bumper support sections are connected to each other by means of mounting elements, said mounting elements holding the winding of the two layers of the leaf spring together.

19. Bumper arrangement according to claim 18, wherein windings of the undulating leaf spring are supported by way of energy-absorbing elements against each other and/or on the bumper support in the open zone lying in opposition to the respective apical region between the windings and, respectively, between the winding closest to the bumper support and the bumper support.

20. Bumper arrangement according to claim 19, wherein the enrgy-absorbing elements consist of a foam material.

21. Bumper arrangement according to claim 19, further comprising impact buffets in the open zones between the windings of the undulating leaf spring and, respectively, between the winding closest to the bumper support and the bumper support, said impact buffers limiting the inward deflection movements of the windings.

22. Bumper arrangement according to claim 18, further comprising impact buffers in the open zones between the windings of the undulating leaf spring and, respectively, between the winding closest to the bumper support and the bumper support, said impact buffers limiting the inward deflection movements of the windings.

* * * * *